United States Patent [19]

Van Damme et al.

[11] Patent Number: 4,595,568
[45] Date of Patent: Jun. 17, 1986

[54] PHOTOSENSITIVE CELL FOR THE DECOMPOSITION OF WATER

[75] Inventors: Henri Van Damme, Olivet; José J. Fripiat, La Ferte St. Aubin; Hubert Nijs, Orleans; Philippe Marceau, Orleans la Source; Obrecht Francois, La Chappelle St-Mesmin, all of France

[73] Assignee: Centre National de la Recherche Scientifique (CNRS), Paris, France

[21] Appl. No.: 505,909

[22] Filed: Jun. 20, 1983

[30] Foreign Application Priority Data

Jun. 28, 1982 [FR] France .................................. 82 11280

[51] Int. Cl.$^4$ .......................... C01B 3/96; C25B 1/04; B01J 19/08
[52] U.S. Cl. .................................... 422/186; 204/129; 423/648 R; 429/111
[58] Field of Search ........................... 422/186.30, 186; 204/302, DIG. 6, 157.1 R, 129, 278; 423/648 R; 429/111

[56] References Cited

U.S. PATENT DOCUMENTS

| 3,800,159 | 3/1974 | Lucas | 422/186.30 |
|---|---|---|---|
| 3,924,139 | 12/1975 | Hirose et al. | 422/186.30 |
| 4,011,149 | 3/1977 | Nozik | 204/129 |
| 4,090,933 | 5/1978 | Nozik | 204/129 |
| 4,367,131 | 1/1983 | Gratzell et al. | 204/157.1 R |

OTHER PUBLICATIONS

Fisher, A. 1978, Splitting Water with Sunlight, Popular Science, vol. 212(6):66–68 and 183.
Journal of the American Chemical Society, vol. 103, No. 16, aout 12 1981 American Chemical Society, Gaston Pa. (US) D. Duonghong et al.: "Dynamics of Light-Induced Water Cleavage in Colloidal Systems", pp. 4685–4690.

*Primary Examiner*—Stephen J. Lechert, Jr.
*Assistant Examiner*—Howard J. Locker
*Attorney, Agent, or Firm*—Ladas & Parry

[57] ABSTRACT

The invention relates to a photosensitive cell for the decomposition of water of the type formed by an aqueous medium containing a photosensitizer positively charged both in the reduced state and in the oxidized state, an acceptor, an oxygen forming catalyst and a hydrogen forming catalyst.

The cell according to the invention is characterized in that each of the two catalysts is fixed to a different support and in that the support of the oxygen forming catalyst is formed by a first, negative charge carrying colloid while the support of the hydrogen forming catalyst is formed by a second, positive charge carrying colloid.

11 Claims, No Drawings

PHOTOSENSITIVE CELL FOR THE DECOMPOSITION OF WATER

This invention relates to a photosensitive cell for the decomposition of water of the type formed by an aqueous medium containing a photosensitizer positively charged both in the reduced state and in the oxidized state, an acceptor, an oxygen forming catalyst and a hydrogen forming catalyst.

The object of the present invention is to perfect the architecture and the composition of a system for the photochemical conversion of solar energy into chemical energy through the photochemical decomposition of water into hydrogen and oxygen in accordance with the following reaction scheme which derives directly from natural photosynthesis:

$$D \xrightarrow{h\nu} D^* \tag{1}$$

$$D^* + A \longrightarrow D_{OX} + A_{RED} \tag{2}$$

$$D^* + A \rightarrow D_{OX} + A_{RED} \tag{2}$$

$$A_{RED} + H^+ \xrightarrow{\text{Cat. red.}} A + \tfrac{1}{2} H_2 \tag{3}$$

$$D_{OX} + OH^- \xrightarrow{\text{Cat. ox.}} D + \tfrac{1}{4} O_2 + \tfrac{1}{2} H_2O \tag{4}$$

The first step of the process is the absorption of a photon by a molecular species in the fundamental state, namely the photosensitizer D. It results in the formation of an excited electron state, D*, in which the initial photonic energy is stored in a highly transitory form.

The second step is an electron transfer between D* and an acceptor. This step, which is made possible through the energy stored by D*, leads to the formation of an electrochemical couple $D_{OX} + A_{RED}$, in which the energy is still stored in a transitory form.

In the third step, this electrochemical energy is converted into stable chemical energy on the one hand through the formation of hydrogen by $A_{RED}$ and on the other hand through the formation of oxygen by $D_{OX}$. During this step, D and A are regenerated. Accordingly, the global reaction may be expressed as follows:

$$H_2O + 2h\nu \rightarrow H_2 + \tfrac{1}{2} O_2 \tag{5}$$

28 kcal are stored in the form of one gram of hydrogen during this process of which the yield evidently depends upon the frequency $\nu$ of the photons used.

It is clear that certain thermodynamic conditions have to be satisfied for a system based on the above reaction scheme to be able to function. D* has to be able to reduce A which itself, in the reduced state $A_{RED}$, has to be able to reduce H+. On the other hand, $D_{OX}$ has to be able to oxidize OH− (or $H_2O$). In terms of oxidoreduction potentials, these various conditions are expressed by the following relations:

$$E(D_{OX}/D^*) < E(A//A_{RED}) < E(H^+/H_2) \tag{6}$$

and $$E(O_2/OH^-) < E(D_{OX}/D) \tag{7}$$

in which:
E (X/X') represents the electrochemical potential corresponding to the following reaction:

$$X + e^- \rightarrow X'.$$

Finally, to arrive at a system which performs efficiently in the spectral region of solar radiation, it is important to keep the excitation energy threshold $h\nu$ as little as possible above the free energy stored (based on the transfer of an electron), i.e. approximately 1.2 eV.

In spite of the various problems presented by the thermodynamic conditions, the main difficulties encountered in the development of systems of the type in question based on the scheme described in the foregoing actually emanate from problems of a kinetic nature. This is because each step of the process may be considered as a "race against the clock" with other reactions which tend to return the system to its initial state without having stored any chemical energy. The primary electron transfer (equation 2) for example is only one method of deactivation amongst others of the excited state D*. It enters into competition with other processes, such as luminescence or transfers of vibrational energy. At the intermediate stage, the oxygen and hydrogen forming reactions (equations 3 and 4) enter into competition with an "inverse" electron transfer reaction which quickly returns the system to its initial state:

$$D_{OX} + A_{RED} \rightarrow D + A \tag{8}$$

Finally, in the last stage, the accumulation of hydrogen and oxygen is in competition with the water reforming reaction: $H_2 + \tfrac{1}{2}O_2 \rightarrow H_2O$. In view of the presence of catalysts in the system, this reaction should not in any way be disregarded.

Accordingly, a first precaution to be taken is to use as the photosensitizer D a compound for which the radiative and non-radiative deactivation processes are not intrinsically too rapid. A requirement such as this is not too difficult to satisfy in practice. On the other hand, to minimize the inverse electron transfer reaction (equation 8) in relation to the formation of oxygen and hydrogen (equations 3 and 4) and to avoid the reformation of water, the means to be used are considerably more complex, in addition to which it has hitherto been impossible to develop a photosensitive cell which is effectively capable of carrying out the photodecomposition of water in accordance with the principle described in the foregoing.

To overcome this problem, a first approach would be to use catalysts as active and as selective as possible for accelerating reactions 3 and 4. The ideal solution would be to be able to synthesize catalysts that would be completely selective either for the formation of hydrogen or for the formation of oxygen, but totally inactive for the formation of water. Unfortunately, catalysts such as these do not exist at the present time.

A second approach, complementary to the first, would be to organize the system on a supramolecular scale in such a way that the following conditions are satisfied:

(1) $D_{OX}$ and $A_{RED}$ separate from one another as they are formed. This is the phenomenon which is known as "charge separation".

(2) The catalytic sites for the formation of hydrogen and oxygen are nowhere near the molecular scale.

(3) $D_{OX}$ and $A_{RED}$ migrate spontaneously towards the corresponding catalytic sites.

Accordingly, the idea behind the present invention was to use colloidal minerals not only as passive catalyst supports, but also as organizing elements of the reaction medium and as active components acting entirely separately as acceptors.

According to the invention, the photosensitive cell for the decomposition of water is characterized in that each of the two catalysts is fixed to a different support and in that the support of the oxygen forming catalyst is formed by a first colloid carrying negative charges whilst the support for the hydrogen forming catalyst is formed by a second colloid carrying positive charges.

In order to enable $D_{OX}$, i.e. the photosensitizer in the oxidized state, for example $Ru(bpy)_3^{3+}$, to migrate spontaneously towards the oxygen forming catalyst, the oxygen forming catalyst was supported by a first colloid carrying negative charges.

It is clear even from simple electrostatic considerations that, in a "negative surface-cationic photosensitizer (or donor)" system of this type, the primary electron transfer (equation 2) will result in an increased adsorption selectivity for the donor because it gains a positive charge. A "cationic photosensitizer-negative colloid-oxygen forming catalyst" combination such as this represents an essential characteristic of the present invention, because it has been found that, if the photosensitizer was not absorbed on the negative colloid, the photosensitive cell for the decomposition of water completely ceased to function.

Other features and advantages of the present invention will become apparent from the following detailed description of particular examples of embodiment.

The photosensitizer used in the photosensitive cell according to the present invention may be formed for example by the complex tris-(2,2'-bipyridine) ruthenium(II) $[Ru(bpy)_3^{2+}]$. It is obvious that the present invention would not be limited in any way by the use of this particular photosensitizer in a photosensitive cell. On the contrary, it is entirely possible to use any other photosensitizer which is adapted to solar radiation and which is capable of absorbing in the visible region of the spectrum and which satisfies the electrochemical conditions mentioned in the foregoing. However, any such photosensitizer must be of the cationic type, i.e. positively charged both in the reduced state and in the oxidized state.

The acceptor used in the photosensitive cells according to the invention may be of two different types. Above all, it may be a molecular compound which is neutral or negatively charged in the reduced state. A migrant molecular acceptor such as this would thus be mobile in the aqueous suspension of the photosensitive cell. The molecular acceptor may be selected for example from neutral viologens, such as 4,4'-bipyridinium propyl sulfonate, neutral europium (III) chelates, such as Eu (III) tris-salicylate, Eu (III) nitrilo-triacetate, Eu (III) tris-acetyl acetonate, Eu (III) tris-oxalate, neutral indium (III) complexes and neutral chromium (III) complexes.

The acceptor used in the photosensitive cells according to the invention may also be in the form of, for example, $Eu^{3+}$ or $In^{3+}$ ions directly incorporated by coprecipitation in the colloid carrying positive charges. This considerably improves the stability of the system.

According to the invention, the first colloid carrying negative charges, i.e. the support for the oxygen forming catalyst, may be formed by any organic or inorganic, crystalline or amorphous solid or polymer which is negatively charged and capable of supporting the oxygen forming catalyst.

A first negative charge carrying colloid such as this may be advantageously selected for example from tectosilicates and phyllosilicates having a large specific surface (i.e. of more than 20 m²/g) which, as a result of isomorphic substitutions in the crystal lattice, carry a permanent negative charge. A first negative charge carrying colloid of this type may be formed with advantage by zeolites, montmorillonite, hectorite and sepiolite. Other examples include polymers or polyelectrolytes, such as polyvinyl sulfates for example.

The second, positive charge carrying colloid, i.e. the support for the hydrogen forming catalyst, may be formed by any crystalline or amorphous solid, oligomer or polymer which carries an optionally permanent positive charge and which is capable of fixing the hydrogen forming catalyst. One example of a second, positive charge carrying colloid of this type is colloidal silica modified by pH adjustment below the zero charge point.

Other examples of the second, positive charge carrying colloid include oligomers of the $Al_{13}O_4(OH)_{24}^{7+}$ type, which are obtained by the hydrolysis of a soluble aluminium salt, and also hydrotalcites which are mixed colloidal hydroxides of aluminium (III) and magnesium (II). It should be noted at this juncture that colloidal silica modified by pH adjustment carries a positive surface charge whereas oligomers of the aluminium hydroxide type and hydrotalcites are in fact colloids carrying a permanent intrinsic positive charge.

The two catalysts used in the photosensitive cells according to the invention may be formed by conventional oxygen forming and hydrogen forming catalysts.

Examples of oxygen forming catalysts are any of the oxides of transition metals which show catalytic activity for this type of reaction and which have been widely described in the literature, particularly in regard to their use in the oxygen or (air) electrodes of fuel cells. Suitable transition metal oxides of this type are, above all, the following oxides: $RuO_2$, $IrO_2$, $NiO$, $OsO_2$, and also mixed oxides of these metals. Oxygen forming catalysts of the type in question may be prepared and deposited on the first, negative charge carrying colloid by any known method commonly used in the field of heterogeneous catalysis, for example by ion exchange-calcination, by ion exchange-decomposition, by impregnation-calcination, by impregnation-decomposition, by coprecipitation-decomposition or even by the decomposition of higher oxides.

It is pointed out that all these catalysts may be reduced to the metallic state before use. It is clear that they reoxidize spontaneously at the surface in the presence of oxygen.

One example of an oxygen forming catalyst of a slightly more particular type is the complex cis-$Ru(II)(2,2'$-bipyridine$)_2(H_2O)_2^{2+}$, which may be fixed by cation exchange to the first, negative charge carrying colloid.

The hydrogen forming catalyst may be formed by any type of conventional electrochemical catalyst which promotes the reaction $H^+ + e^- \rightarrow \frac{1}{2}H_2$. Particular examples include platinum, gold and silver in metallic, particulate form. These hydrogen forming catalyst metals may be fixed to the second, positive charge colloid by any conventional method commonly used in the field of heterogeneous catalysis, including for example ion exchange, impregnation, reduction with hydrogen or with any other reducing agent, such as hydrazine or citrate, autodecomposition of amine complexes, photodecomposition, etc.

In another advantageous embodiment of the present invention, the cell comprises a colloidal aqueous suspension containing a first, negative charge carrying colloid formed by sepiolite to which ruthenium oxide is fixed and to which the cationic photosensitizer is additionally fixed by an ionic bond. The second, positive charge carrying colloid is formed by a mixed colloidal hydroxide of $Al^{3+}$ and $Eu^{3+}$ or $In^{3+}$ on which platinum is deposited.

The $Eu^{3+}$ or $In^{3+}$ ions are best incorporated in the second colloid in a proportion of from about 1 to about 5% expressed as a molar fraction, based on the aluminium.

The second, positive charge carrying colloid incorporating $Eu^{3+}$ or $In^{3+}$ ions and supporting the platinum is prepared for example by mixing colloidal suspensions of the hydroxide with an anionic salt of platinum, such as $PtCl_4^{2-}$, followed by reduction with hydrazine. The excess hydrazine is subsequently eliminated by washing.

The invention is illustrated by the following two Examples which describe the procedure adopted for preparing a colloidal cell for the photodissociation of water into hydrogen and oxygen using visible light (350–700 nm).

EXAMPLE 1

Cell using an acceptor included in the second, positive charge carrying colloid (a) Preparation of the first, negative charge carrying colloid 1/ Fixing of the ox. catalyst:

50 g of sepiolite are suspended in 1 liter of an aqueous solution containing 500 mg of $Ru(NH_3)_6Cl_3$. The suspension thus formed is then stirred for 24 hours at ambient temperature and subsequently centrifuged (for approximately 30 minutes at 2000 G). The centrifuging residue is washed 3 times with distilled water by re-suspending-centrifuging cycles in order to eliminate any excess of $Ru(NH_3)_6^{3+}$ which has not been fixed to the sepiolite by cation exchange. After washing, the sepiolite is dried and heated in air for 3 hours to 230° C. in order to decompose the amine-containing ruthenium complex and to oxidize it to $RuO_2$. The sample is then ground to facilitate its subsequent redispersion in aqueous medium.

2/ Fixing of the photosensitizer 500 mg of the sepiolite prepared as described above are suspended in 50 ml of an aqueous solution containing 30 mg of $Ru(2,2'\text{-bipyridine})_3Cl_2.6H_2O$. The resulting suspension is then stirred for 15 hours and centrifuged. The supernatant phase is eliminated and the sepiolite-$RuO_2$, to which the $Ru(bpy)_3^{3+}$ has been fixed by cation exchange, is stored in moist form.

(b) Preparation of the second, positive charge carrying colloid

1/ Preparation of the actual colloid

A solution of 36 g of $Al(NO_3)_3.6H_2O$ and 3 g of $Eu(NO_3)_3.5H_2O$ is adjusted to pH 9.5 with 1N NaOH. The gel obtained is separated by centrifuging and washed once with distilled water. The final gel obtained contains 3.4% of dry matter.

2/ Fixing of the catalyst 3 g of the gel prepared as described above are suspended in 500 ml of an aqueous solution (pH 6) containing 50 mg of $K_2PtCl_4$. The suspension is stirred for 2 hours and the platinum is reduced by the addition of 3 ml of 90% hydrazine. The gel+platinum is washed three times with distilled water.

(c) Preparation of the colloidal cell 500 mg of the first, negative charge carrying colloid and 3 g of the second, positive charge carrying colloid are suspended in 50 ml of distilled water in the absence of light. When a homogeneous dispersion is obtained, 10 ml of a buffer solution of $KH_2PO_4$, 0.02M (pH 3.4), are added to the suspension which is then poured into a cylindrical reactor of Pyrex equipped with an inlet valve and an outlet valve. The whole is deaerated either by passing through a stream of helium or argon or by degassing using a vane pump. The cell is then irradiated by a 500 W tungsten lamp situated at a distance of about 50 cm and equipped with a UV-filter and an IR-filter. The pressure of the gases is monitored by an electronic manometer and the gases are analyzed by gas-phase chromatography (carrier gas: He or Ar; column: molecular sieve 5 A; ambient temperature). The irradiation of this cell effectively produces hydrogen and oxygen.

The total quantity of gases produced by the cell which has just been described is approximately $0.2.10^{-3}$ moles for an irradiation time of 3 hours.

EXAMPLE 2

Cell using an acceptor included in the second, positive charge carrying colloid

The first, negative charge carrying colloid is prepared in exactly the same way as in Example 1(a).

The second, positive charge carrying colloid is also prepared in the same way as in Example 1(b), except that 2 g of $In(NO_3)_3.5H_2O$ are used instead of europium nitrate for preparing the actual colloid.

The colloidal cell thus prepared produces a total quantity of gases of $3.10^{-6}$ moles per hour for more than 24 hours.

EXAMPLE 3

Cell using a mobile molecular acceptor independent of the second, positive charge carrying colloid (a) Preparation of the first, negative charge carrying colloid The procedure is exactly the same as in Example 1.

(b) Preparation of the second, positive charge carrying colloid 100 mg of silica gel ("Aerosil") are dispersed in 500 ml of an aqueous solution containing 5 mg of $K_2PtCl_4$. The platinum is reduced by the addition of 3 ml of 90% hydrazine and the excess hydrazine is removed by 3 cycles of centrifuging and redispersion in distilled water. The washed gel is dried at 110° C. and ground.

(c) Preparation of the cell 250 mg of the first, negative charge carrying colloid and 20 mg of the second, positive charge carrying colloid are dispersed in 50 ml of water buffered to pH 3.1 by $KH_2PO_4$. At this pH-value, the surface of the silica carries a positive charge. 150 mg of europium salicylate, Eu(sal)$_3$, are added in darkness and the cell is deaerated in the same way as in Example 1. The irradiation of this cell produces approximately 0.07. $10^{-3}$ moles of (H$_2$+½O$_2$) in 3 hours.

The present invention is of course in no way limited to the embodiments described in the foregoing to which a certain number of modifications may be made within the scope of the invention.

We claim:

1. A photosensitive cell for the decomposition of water, comprising an aqueous medium containing a photosensitizer positively charged both in the reduced state and in the oxidised state, an acceptor, an oxygen-forming catalyst, a first support to which said oxygen-forming catalyst fixed and formed by a first, negative-charge-carrying colloid of large-surface tectosilicates and phyllosilicates, which as a result of isomorphic substitutions in the crystal lattice carry a permanent negative charge, a hydrogen-forming catalyst, and a second support to which said hydrogen-forming catalyst is fixed and formed by a second, positive-charge-carrying colloid of colloidal silica modified by a pH adjustment, below the zero charge point, hydrotalcites, or a mixed colloidal hydroxide of Al$^{3+}$ and Eu$^{3+}$ or In$^{3+}$.

2. A cell as claimed in claim 1, wherein said tectosilicates and phyllosilicates are zeolite, montmorillonite, hectorite or sepiolite.

3. A cell as claimed in claim 1, wherein the acceptor is a molecular compound which is neutral or negatively charged in the reduced state selected from neutral viologens.

4. A cell as claimed in claim 1, wherein the acceptor is in the form of Eu$^{3+}$ or IN$^{3+}$ ions directly incorporated by coprecipitation in the second, positive-charge-carrying colloid.

5. A cell as claimed in claim 1, wherein the Eu$^{3+}$ or IN$^{3+}$ ions are incorporated in the second colloid in a proportion of from 1 to 5%, expressed as a molar fraction.

6. A cell as claimed in claim 1, wherein the first, negative-charge-carrying colloid is formed by sepiolite to which ruthenium oxide is fixed and to which the positively charged photosensitizer is fixed by an ionic bond and the second, positive-charge-carrying colloid is formed by a mixed colloidal hydroxide of Al$^{3+}$ and Eu$^{3+}$ or IN$^{3+}$ on which Pt is deposited.

7. A cell as claimed in claim 1, wherein the photosensitizer is the complex tris-(2,2'-bipyridine) ruthenium (II).

8. A cell as in claim 1 wherein the oxygen forming catalysts are oxides of transition metals.

9. A cell as in claim 8, wherein the hydrogen forming catalyst is platinum, gold or silver, in metallic, particulate form.

10. A cell as claimed in claim 3, wherein said neutral viologens are 4,4'-bipyridinium propyl silfonate, neutral europium (III) chelates, such as Eu (III) tris-salicylate, Eu (III) nitrilotriacetate, Eu (III) tris-acetyl acetonate, Eu (III) tris-oxalate, neutral indium (III) complexes or neutral chromium (III) complexes.

11. A cell as in claim 8, wherein said oxides of transition metals are: RuO$_2$, IrO$_2$, NiO, O$_5$O$_2$ or mixed oxides thereof.

* * * * *